United States Patent [19]

Ohno et al.

[11] Patent Number: 5,498,860
[45] Date of Patent: Mar. 12, 1996

[54] PORTABLE STORAGE MEDIUM AND PROCESSING APPARATUS THEREFOR

[75] Inventors: Tadayoshi Ohno; Takashi Yamaguchi; Shinichi Itoh; Hisatoshi Tanaka, all of Kawasaki, Japan

[73] Assignee: Kabushiki Kaisha Toshiba, Kawasaki, Japan

[21] Appl. No.: 207,694

[22] Filed: Mar. 9, 1994

[30] Foreign Application Priority Data

Mar. 11, 1993 [JP] Japan ..................... 5-050290

[51] Int. Cl.⁶ ................................. G07B 15/02
[52] U.S. Cl. ........................... 235/384; 235/487
[58] Field of Search ..................... 235/492, 380, 235/379, 384, 487, 432; 434/114

[56] References Cited

U.S. PATENT DOCUMENTS

| | | | |
|---|---|---|---|
| 3,501,622 | 3/1970 | Weir et al. | 235/384 |
| 3,984,660 | 10/1976 | Oka et al. | 235/384 X |
| 4,194,190 | 3/1980 | Bareau | 434/114 X |
| 4,507,346 | 3/1985 | Maurer et al. | 235/488 X |
| 4,694,494 | 9/1987 | Woolfson | 434/114 X |
| 4,761,542 | 8/1988 | Kubo et al. | 235/379 |
| 5,231,450 | 7/1993 | Daniels | 355/27 |
| 5,306,152 | 4/1994 | Shimoda | 434/114 |

FOREIGN PATENT DOCUMENTS

| | | | |
|---|---|---|---|
| 2667186 | 3/1992 | France | 434/114 |
| 54-89638 | 7/1979 | Japan . | |
| 404003287 | 1/1992 | Japan | 235/380 |

Primary Examiner—Donald T. Hajec
Assistant Examiner—Jeffrey R. Filipek
Attorney, Agent, or Firm—Cushman, Darby & Cushman

[57] ABSTRACT

A magnetic recording layer for storing information is formed on the lower surface of a card, and a protective film is formed on the magnetic recording layer. Permanent information, e.g., the valid term of the card and the name of a user, and variable information, e.g., card use history information, are magnetically recorded on the magnetic recording layer. A printed layer is formed on the upper surface of the card. Permanent information such as the valid term of the card and the name of the user is printed on the printed layer. A braille portion indicating purpose of the card in braille is formed on the upper surface of the card.

5 Claims, 4 Drawing Sheets

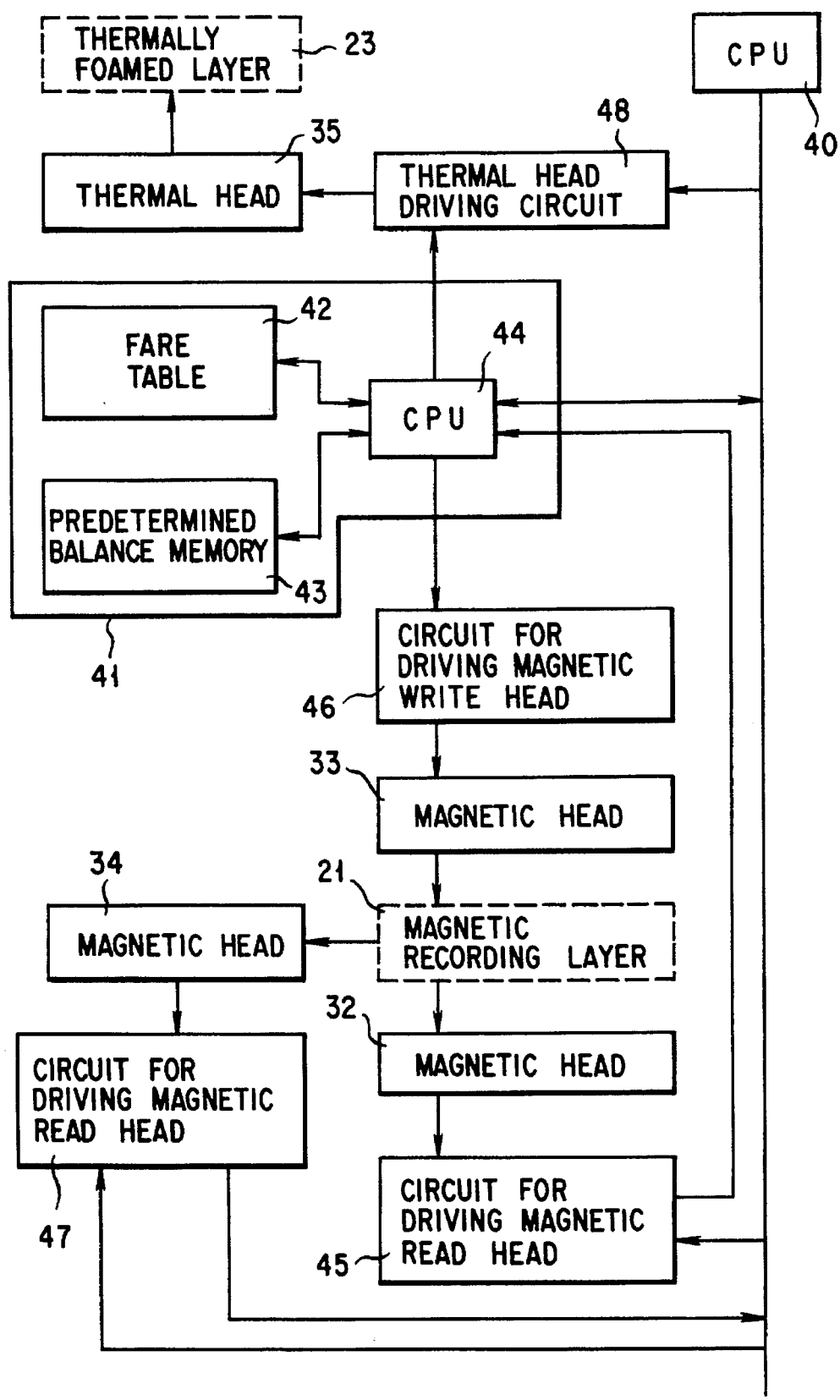
F I G. 6

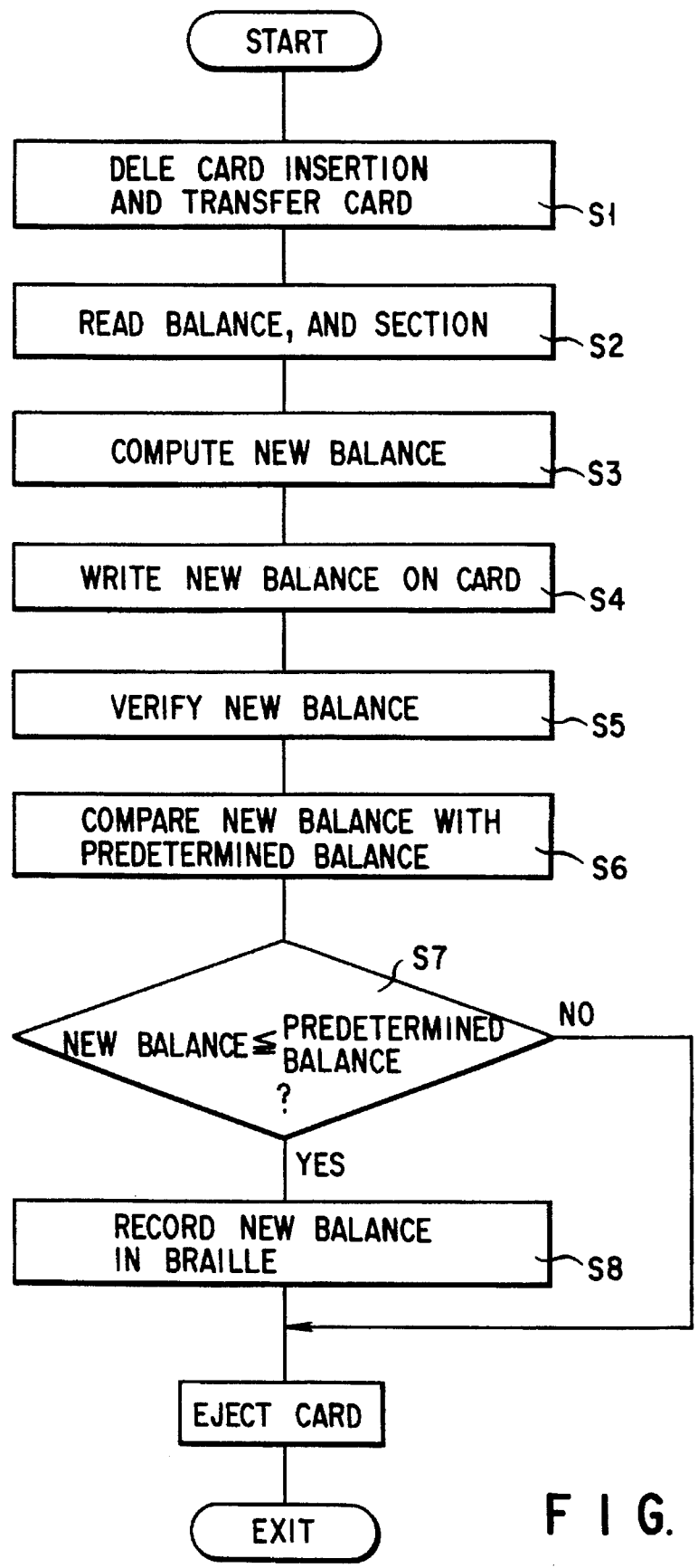
F I G. 7

PORTABLE STORAGE MEDIUM AND PROCESSING APPARATUS THEREFOR

BACKGROUND OF THE INVENTION

1. Field of the Invention

The present invention relates to a portable storage medium, such as a season ticket used in a transport system, an IC card for identification, or a prepaid card. The present invention also relates to a portable storage medium processing apparatus for processing the portable storage medium.

2. Description of the Related Art

Recently, systems using various types of cards have been put into practice. For example, cash cards for both prepaid and post-paid schemes are available. Prepaid cards include telephone cards, "orange cards" in a passenger railroad system, amusement arcade cards, amusement park cards, bus cards, and the like. Post-paid cards include various types of credit cards. As described above, systems using cards are widely applied to various fields, e.g., transport systems, delivery systems, and amusement facilities. In addition, systems using cards, such as identification cards, which are not associated with cash processing, e.g., entrance/exit management systems, are widely employed.

An unattended system has recently been developed, in which, as in a stored fare wicket system in a transport system, when a user inserts a prepaid card in an automatic wicket apparatus, the fare for vehicle use section is automatically paid. It is expected that such systems will increase in number in the future. These systems are connected to users through cards, and are operated on the assumption that proper cards matching the systems are used.

As systems using various types of cards are in operation, it is not rare for one person to have a plurality of cards. In order to select a proper card matching a system to be used from a plurality of cards, visual information displayed on the surface of each card is generally read and recognized visually. However, it is difficult for a visually handicapped user to select a proper card by reading visual information display on the surface of each card. As mechanical systems based the use of cards are applied to a variety of fields, it is important to allow visually handicapped users to easily select proper cards matching systems.

As characters which can be read by visually handicapped people, braille constituted by holes formed in various arrangements is known. As a system for performing an electrophotographic printing operation, a stereoscopic copy system has been proposed (see, e.g., Jpn. Pat. Appln. KOKAI Publication Nos. 54-89638 and 56-92544). This system is designed to form three-dimensional images on the surface of a paper sheet by using a combination of a technique of thermally expansive microcapsules and an electrophotographic recording technique. In the system, a toner image formed by an electrophotographic process is transferred onto a thermally foamed layer constituted by thermally expansive microcapsules and a thermoplastic binder and formed on a base sheet. The surface of the layer is then irradiated by a halogen lamp. As the toner absorbs light and generates heat, only the portions on which the toner image is transferred are heated, thus selectively causing thermally expansive microcapsules to protrude to form projections on the surface of the layer.

In spite of the fact that mechanical systems based on the use of cards have been widely employed, there is not a card which allows a handicapped user to easily select in accordance with a system to be used, nor is there a prepaid card which allows a visually handicapped user to know the balance (used state).

SUMMARY OF THE INVENTION

It is, therefore, an object of the present invention to provide a card, i.e., a portable storage medium, which allows even a visually handicapped user to easily identify the type of card and use the card for a particular purpose, and also allows the user to easily determine the insertion direction of a card having a three-dimensional pattern according to the present invention so as to prevent troubles caused when the card is inserted in a wrong direction.

It is another object of the present invention to provide a portable storage medium which allows even a visually handicapped user to easily know the used state of the card, e.g., the amount or balance which can be used, and also provide a card processing apparatus which reads information stored in such a storage medium, performs balance processing based on the information, and writes/displays information.

In order to achieve the above objects, according to the present invention, there is provided a portable storage medium including: a card base; a storage portion for storing information, capable of mechanically reading and writing; and a braille display portion formed on a surface of the card base without overlapping the storage portion, for displaying the information, stored in the storage portion, in braille.

In addition, according to the present invention, there is provided a portable storage medium for storing information from an external device and supplying the stored information to the external device, including: a base; a storage portion for electrically storing predetermined information; a contact portion, arranged on one surface of the base, for electrically connecting the storage portion to the external device; and a braille display portion, arranged on the other surface of the base, for displaying the predetermined information, stored in the storage portion, in braille.

Furthermore, according to the present invention, there is provided a portable storage medium including: a base; a magnetic recording layer, formed on one surface of the base, for magnetically storing information; and a braille display portion, arranged on the other surface of the base, for displaying predetermined information in braille.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

FIGS. 1A and 1B show the arrangement of a season ticket as a portable storage medium according to the first embodiment of the present invention, in which FIG. 1A is a plan view of the pass viewed from the printed surface side, and FIG. 1B is a sectional view taken along a line IB—IB of FIG. 1A;

FIGS. 2A and 2B show the arrangement of an identification IC card as a portable storage medium according to the second embodiment of the present invention, in which FIG. 2A is a plan view of the card viewed from the printed surface side, and FIG. 2B is a sectional view taken along a line IIB—IIB of FIG. 2A;

FIG. 6 is a block diagram showing the electric arrangement of a portion, of the card processing apparatus in FIG. 5, which is mainly associated with balance/braille recording processing; and FIG. 7 is a flow chart for explaining the operation of the card processing apparatus shown in FIGS. 5 and 6.

DETAILED DESCRIPTION OF THE PREFERRED EMBODIMENTS

An embodiment of the present invention will be described below with reference to the accompanying drawings.

Figure 1A:
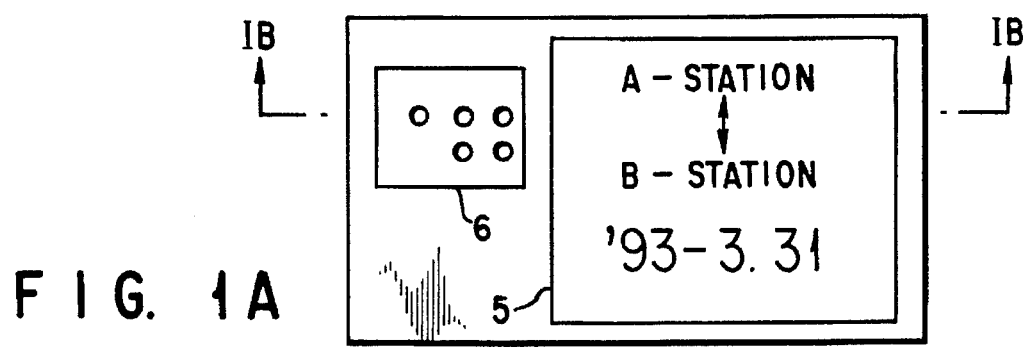
Figure 1B:
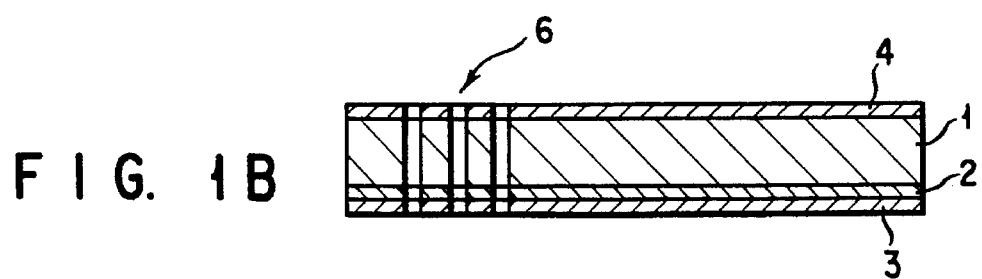

The first embodiment of the present invention will be described first. FIGS. 1A and 1B show a season ticket, as a portable storage medium according to the embodiment, which is used for an automatic wicket system installed in a passenger railroad system. Reference numeral 1 denotes a card base made of, e.g., a synthetic resin such as polyester or white vinylchloride, or a paper material, in the form of a card. Note that base 1 generally has a thickness of about 20 to 50 μm. In this embodiment, as the base 1, a 188-μm thick polyethylene terephthalate card is used.

As shown in FIG. 1B, a magnetic recording layer 2 for storing magnetic information is formed on one surface (lower surface) of the base 1. A protective film 3 for protecting the magnetic recording layer 2 against mechanical damage is formed on the surface of the magnetic recording layer 2. The magnetic recording layer 2 generally has a coercive force of about 300 to 3,000 Oe. In this embodiment, the magnetic recording layer 2 has a coercive force of 2,750 Oe. The magnetic recording layer 2 generally has a thickness of 10 to 50 μm. In the embodiment, the magnetic recording layer 2 has a thickness of 12 μm. Permanent information, e.g., the valid section and term of the season ticket and the name of a user, and variable information, e.g., boarding history information, are magnetically recorded on the magnetic recording layer 2.

A printed layer 4 is formed on the other surface (upper surface) of base 1. As shown in FIG. 1A, a permanent information storage portion 5 is arranged on the printed layer 4. Permanent information such as the valid section and term of the season ticket and the name of the user are printed on the permanent information storage portion 5. In addition, this card has a braille portion 6 indicating in braille or raised type that the card is a season ticket. In the embodiment, braille points are formed from through holes, which can be easily formed by a conventional method such as a punching process, when braille points are to be formed by forming through holes, the position of the braille portion 6 needs to be determined such that the through holes do not damage a portion, of magnetic recording layer 2, on which valid information is recorded. In addition, as shown in FIG. 1B, through holes must be formed without forming projections of braille points on the magnetic recording layer 2 side so as to prevent damage to a magnetic head for reading/writing magnetic information.

As described above, according to the card of the present invention, since the type of card, i.e., that the card is a season ticket, is displayed in braille, even a visually handicapped user can easily recognize with the sense of touch that the card is a season ticket. This prevents the user from mistakenly using a wrong card.

Figure 2A:
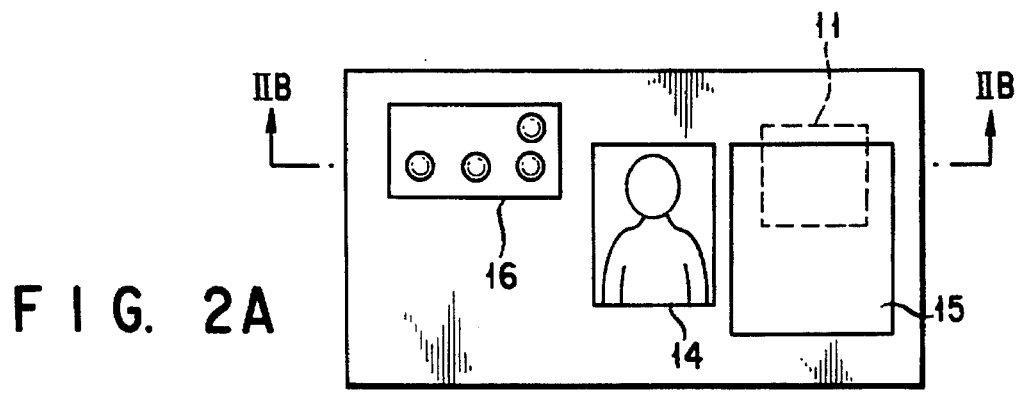
Figure 2B:
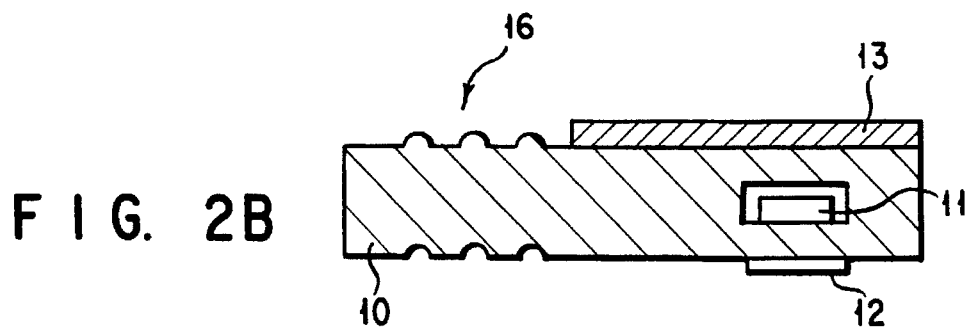

The second embodiment of the present invention will be described next. FIGS. 2A and 2B show an identification IC card as a portable storage medium according to the embodiment. Referring to FIGS. 2A and 2B, reference numeral 10 denotes a base, which is generally made of a synthetic resin such as white vinylchloride or polyester. In this embodiment, a laminated white vinylchloride member having a thickness of about 800 μm is used as the base 10. An IC memory 11 as a storage means for storing information is embedded in the base 10. A read/write control circuit (not shown) such as an address decoder is arranged for the IC memory 11 so that the internal information of the IC memory 11 can be updated by an external device, the IC memory 11 serves to store private information associated with the user of the card, the valid period of the card, security information on a system, and the like.

A contact portion 12 for electrically connecting the IC memory 11 in the card to an external device is formed on one surface (lower surface) of the base 10. Information stored in the IC memory 11 is updated by the external device electrically connected thereto via the contact portion 12. A printed layer 13 is formed on the other surface (upper surface) of the base 10. As shown in FIG. 2A, an image recording portion 14, a permanent information recording portion 15, and the like are arranged on the printed layer 13. A photograph of the face of the user is printed on the image recording portion 14. Permanent information, e.g., the name and post of the user and the effective period of the card, is printed on the permanent information recording portion 15.

In addition, the base 10 has a braille portion 16 for displaying, in braille, that the card is an IC card for identification. In this case, as shown in FIG. 2B, braille points are formed such that projections are formed on the printed layer 13 side, while recesses are formed on the contact portion 12 side. Such a shape can be formed by embossing or the like as a conventional technique. Note that white vinylchloride as a material for the base 10 used in the embodiment exhibits excellent workability with respect to such embossing. Furthermore, as will be described later, it is preferable that projections be formed on the side opposite to the contact portion 12 side.

The braille portion 16 is preferably formed on the end portion, of the card, which is opposite to the end portion on which the contact portion 12 is formed. With this arrangement, contamination or corrosion of the contact portion 12 due to the fingers of the user can be minimized. Therefore, when the IC card of the embodiment is connected to an external device, an excellent contact can be ensured between the contact portion (not shown) of the external device and the contact portion 12 of the IC card. In addition, the side of surfaces and portion of ends on which the projections of the braille portion 16 are formed are specified in relation to the contact portion 12. This prevents the user from erroneously inserting the IC card into the external device in a wrong direction.

As described above, since the type of card, i.e., that the card is an IC card for identification, is displayed in braille, even a visually handicapped user can easily recognize through the sense of touch that the card is n IC card for indentification. This prevents the user from mistakenly using a wrong card. In this embodiment, the card itself is processed to display information in braille. However, a seal on which information about the type of card is recorded in braille in advance may be stuck on the surface of the card to form a braille portion. As is apparent, even in this case, the same positional relationship between the braille portion and the contact portion as that described above is maintained.

Figure 3:
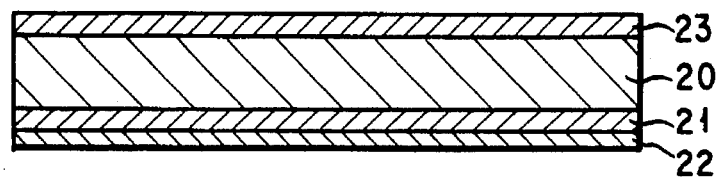
FIG. 3 is a longitudinal sectional view showing the arrangement of a prepaid card as a portable storage medium according to the third embodiment of the present invention.

The third embodiment of the present invention will be described next. FIG. 3 shows a prepaid card as a portable storage medium of this embodiment. Referring to FIG. 3, reference numeral 20 denotes a base; 21, a magnetic recording layer; and 22, a printed layer. Since the base 20 and the magnetic recording layer 21 consist of the same material and have the same characteristics as those of base 1 and magnetic recording layer 2 shown FIGS. 1A and 1B, a description thereof will be omitted.

Information such as the maximum amount which can be spent, the balance, and the use history is magnetically recorded on one surface (lower surface) of the base 20. The application range of the card, the amount paid in advance, and the like are printed, as visual images, on the printed layer 22.

A thermally foam layer 23 as a braille portion is formed on the other surface (upper surface) of the base 20. As indicated by the schematic structure in FIG. 4A, the thermally foamed layer 23 is constituted by thermally expansive microcapsules 24 and a thermoplastic binder 25. Each of the thermally expansive microcapsules 24 is a microcapsule which expands, four to five times in diameter and 50 to 100 times in volume, when heated at a relatively high temperature for a relatively short period of time, and has an average cell diameter of 10 to 30 μm. This microcapsule is formed by covering a volatile organic solvent (inflating agent) as a core, such as isobutane, pentane, naphta, or low-boiling hydrocarbon halide, with a thermoplastic resin as a shell substance, constituted by one of such copolymers constituted by vinylidene chloride, acrylonitrile, acrylate, methacrylate, and the like. Note that an insite method is generally used as a method of manufacturing such thermally expansive microcapsules. A method of manufacturing thermally expansive microcapsules is disclosed in, e.g., Jpn. Pat. Appln. KOKAI Publication Nos. 63-24538 and 1-301730.

In this embodiment, isobutane is used as an inflating agent, and a copolymer constituted by vinylidene chloride and acrylonitrile is used as a shell material. The same material as the shell material for the thermally expansive microcapsules 24 is used for the thermoplastic binder 25.

Figure 4A:
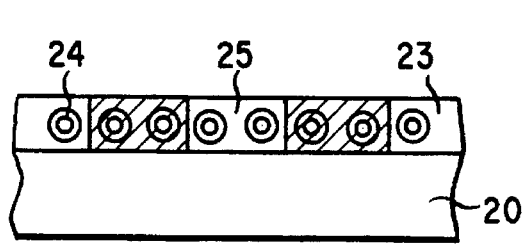
FIGS. 4A and 4B are sectional views for explaining the foaming operation of a thermally foamed layer of the prepaid card shown in FIG. 3.
Figure 4B:
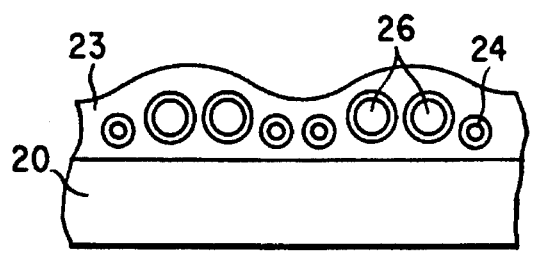

Foaming of the thermally foamed layer 23 will be described in detail with reference to FIGS. 4A and 4B. When the thermally expansive microcapsules 24 and the thermoplastic binder 25 are heated to at least the softening point of the shell material (indicated by hatched portions in FIG. 4A), the shell material and the thermoplastic binder 25 begin to soften. At the same time, the film is stretched with an increase in vapor pressure of the inflating agent contained in the microcapsules 24. As a result, the thermally expansive microcapsules 24 expand.

When heating is stopped, and the shell material and the thermoplastic binder 25 are cooled down to a temperature below the softening point, expanded capsules 26 are fixed in the expanded state. As a result, the heated portions protrude more than the remaining portions (see FIG. 4B). Therefore, projections can be selectively formed on the thermally foamed layer 23. By selectively causing portions of the thermally foamed layer 23 to foam so as to indicate that the card is a prepaid card in this manner, a braille portion indicating the type of card can be formed. Since braille points indicating the type of card can be formed on a card at the time of issue, cards having the same structure can be used for a plurality of purposes.

Figure 5:
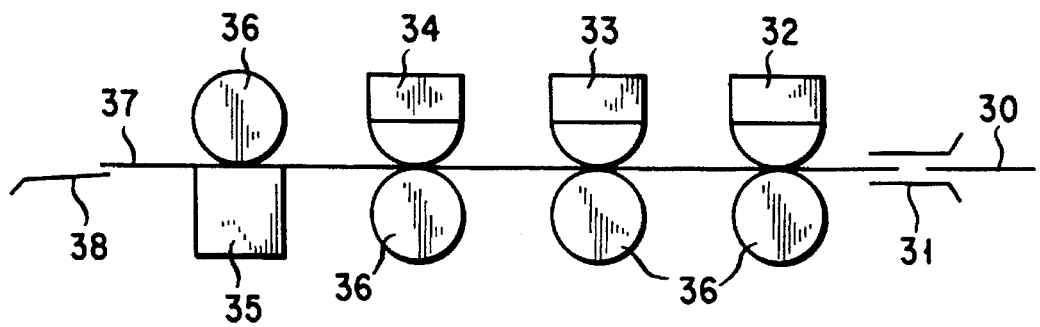
FIG. 5 is a view illustrating the main part of a card processing apparatus for processing the prepaid card shown in FIG. 3.

A card processing apparatus for performing balance processing and the like with respect to prepaid card having the above-described arrangement will be described with reference to FIG. 5. FIG. 5 illustrates a mechanical portion of the card processing apparatus. Referring to FIG. 5, reference numeral 30 denotes a prepaid card; 31, a card insertion port; 32, a magnetic read head for reading magnetic information from a magnetic recording layer 21 of the prepaid card 30; 33, a magnetic write head for writing updated information and the like on the magnetic recording layer 21 of the prepaid card 30; 34, a magnetic read head for reading magnetic information recorded on the magnetic recording layer 21 of the prepaid card 30 to perform collation; 35, a thermal head as a thermal recording means for recording information on a thermally foamed layer 23 of the prepaid card 30 in braille; 36, platen rollers; 37, a convey path for the prepaid card 30; and 38, a card ejection port. The platen rollers 36 are driven by a common drive source (not shown) to convey the prepaid card 30 from the card insertion port 31 to the card ejection port 38 along the convey path 37. The magnetic heads 32, 33, and 34 and the thermal head 35 are respectively driven by driving circuits (to be described later).

FIG. 6 shows the electrical arrangement of a portion, of the card processing apparatus in FIG. 5, which is mainly associated with balance and braille recording processing. Referring to FIG. 6, reference numeral 40 denotes a main CPU (Central Processing Unit) for controlling the overall operation of the apparatus; and 41, a balance/braille recording designation section for determining a balance recording operation with respect to a balance/thermally foamed layer 23. The balance/braille recording designation section 41 is constituted by a fare table 42, a predetermined balance memory 43, and sub-CPU 44 for controlling them. The section 41 is controlled by the CPU 40.

Reference numeral 45 denotes a circuit for driving a magnetic read head, which circuit is controlled by the CPU 40 to electrically drive the magnetic read head 32; 46, a circuit for driving a magnetic write head, which circuit is controlled by the CPU 44 to electrically drive the magnetic write head 33; 47, a circuit for driving a magnetic read head, which circuit is controlled by the CPU 40 to electrically drive the magnetic read head 34; and 48, a thermal head driving circuit which is controlled by the CPUs 40 and 44 to electrically drive the thermal head 35.

The operations of the arrangements shown in FIGS. 5 and 6 will be described next with reference to the flow chart shown in FIG. 7. When the prepaid card 30 is inserted in the card insertion port 31, the CPU 40 receives a signal from a card insertion detector (not shown) to drive the card convey/drive system, thus conveying the prepaid card 30 to the magnetic read head 32 (step S1).

The magnetic read head 32 reads information associated with the current balance and the current section from the magnetic recording layer 21 of the prepaid card 30 (step S2). The read information is sent to the CPU 44 of the balance/braille recording designation section 41 via the circuit 45. The CPU 44 calculates a fare by referring to the fare table 42 on the basis of the section information, and calculates a new balance (step S3). The new balance information calculated in this manner is written on the magnetic recording layer 21 by the magnetic write head 33, thus updating the balance information on the magnetic recording layer 21 (step S4). The updated balance information is read by the magnetic read head 34 and collated with the updated balance information stored by the CPU 44, thereby determining whether the balance information is properly updated (step S5).

The CPU 44 compares the newly calculated balance information with the amount set and stored in the set balance memory 43 in advance (step S6). If the updated balance is less than the set balance, the CPU 44 supplies pieces of information indicating the updated balance and driving of the thermal head to the CPU 40. The CPU 40 supplies image data for recording the updated balance in braille to the circuit 48 on the basis of these pieces of information. The thermal head 35 then selectively heats the thermally foamed layer 23. As described above, the heated portions protrude to record the balance in braille (step S8). In general, the time required for such protrusion is several tens milliseconds.

If it is determined upon the above comparison that the balance information is more than the predetermined amount, the CPU 40 transfers the prepaid card 30 to the card ejection port 38 without causing the thermal head 35 to record the balance in braille. In this manner, when the balance of a prepaid card becomes less than a predetermined amount, the balance is displayed in braille, thereby allowing even a visually handicapped user to easily know that the balance is close to zero.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An apparatus for recording information on a portable storage medium adapted to be used a plurality of times and having a first storage means for storing a first balance, comprising:

recording means for recording information on said portable storage medium;

reading means for reading said first balance stored in said first storage means each time said portable storage medium is used;

calculation means for performing a predetermined calculation based on said first balance read by said reading means and providing a second balance;

update means for writing said second balance to said first storage means and charging said first balance stored in said first storage means to said second balance;

second storage means in which a third balance having a predetermined value is stored in advance;

comparing means for comparing said second balance with said third balance; and control means for controlling said recording means in order to record information based on said second balance in braille on said portable storage medium when said comparing means detects that said second balance is smaller than said third balance.

2. An apparatus according to claim 1, wherein said portable storage medium includes a thermally foamed layer for displaying information recorded by said recording means in braille.

3. An apparatus according to claim 2, wherein the portable medium includes a base, said storage means is formed on one surface of said base and said thermally foamed layer is formed on an opposite surface of said base.

4. An apparatus according to claim 1, wherein the portable storage medium is a prepaid card.

5. An apparatus according to claim 1, wherein a type of usage is recorded in braille on said portable storage medium.

* * * * *